Figure 1:
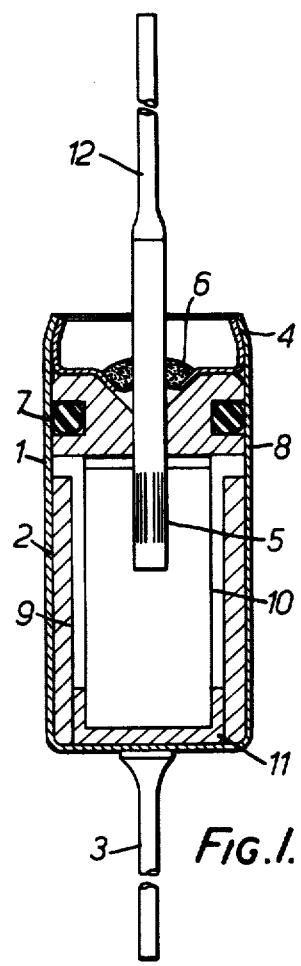

United States Patent [19]

Smith et al.

[11] 4,296,458
[45] Oct. 20, 1981

[54] ELECTROLYTE CAPACITORS WITH IMPROVED ANODE-TO-LEAD CONNECTION

[75] Inventors: Leslie Smith, Towcester; William Tew, Stoke Bruene; Jack Woolley, Haversham, all of England

[73] Assignee: Plessey Handel und Investments A.G., Zug, Switzerland

[21] Appl. No.: 961,919

[22] Filed: Nov. 20, 1978

[30] Foreign Application Priority Data

Nov. 24, 1977 [GB] United Kingdom ............. 48885/77

[51] Int. Cl.³ .................. H01G 9/00; B01J 17/00
[52] U.S. Cl. .................. 361/433; 29/570; 174/50.5; 174/50.57
[58] Field of Search ............. 361/433; 29/570; 174/50.5, 50.57

[56] References Cited

U.S. PATENT DOCUMENTS

| | | | |
|---|---|---|---|
| 2,871,424 | 1/1959 | Aikman | 361/433 |
| 3,243,316 | 3/1966 | O'Nan et al. | 361/433 |
| 3,293,507 | 12/1966 | Smith | 361/433 |
| 3,302,072 | 1/1967 | Oneil | 361/433 |
| 3,314,124 | 4/1967 | Okamoto et al. | 361/433 |
| 3,321,675 | 5/1967 | Diggens | 361/433 |
| 3,534,230 | 10/1970 | Krasienko et al. | 361/433 |
| 3,624,458 | 11/1971 | Howell | 361/433 |
| 3,684,927 | 8/1972 | Correll | 361/433 |
| 3,906,311 | 9/1975 | Shoot et al. | 361/433 |
| 4,025,827 | 5/1977 | Pellerin | 361/433 |

*Primary Examiner*—Andrew J. James
*Attorney, Agent, or Firm*—Fleit & Jacobson

[57] ABSTRACT

A method of assembling an electrolytic capacitor comprise the following steps: an annular sleeve shaped cathode is inserted into the open end of a can; an anode structure is inserted into said can in a spaced apart relationship from said cathode, the space between said anode and cathode being filled with an electrolyte, said anode structure having an aperture or recess for reception of an anode lead, a primary seal, for sealing the open end of the can, and comprising an anode lead electrically isolated from the rest of the seal; is formed; a secondary seal is positioned on the anode lead on the inside face of said primary seal to form a seal between said anode lead and said can prior to sealing of the primary seal of said capacitor; the end of the anode lead projecting from said secondary seal is machined to provide projections on said lead; the capacitor is assembled by forcing the projecting portion of said anode lead into said anode until the primary seal is in position; the primary seal is welded around its periphery to said can; and the capacitor is subjected to an aging process to restore any damage to said anode and anode lead structure incurred during the assembling/forcing operation.

11 Claims, 6 Drawing Figures

U.S. Patent

Oct. 20, 1981

4,296,458

ELECTROLYTE CAPACITORS WITH IMPROVED ANODE-TO-LEAD CONNECTION

The present invention relates to electrolytic capacitors having, for example, tantalum anodes and more particularly relates to the hermetic sealing of such capacitors.

Electrolytic capacitor assemblies with the non-solid electrolytes comprise a container into which a capacitor anode is placed. The interior wall of the container also serves as the cathode, the capacitance of which can be augmented by any treatment which will increase the surface area.

Hitherto, hermetic glass-to-metal seals have been constructed as follows: a central tubular metal eyelet is circumscribed by a glass ring which is sealed thereto, and a metal washer circumscribes the glass ring and is sealed thereto. The anode lead wire is positioned so that it passes up the metal eyelet. The glass-to-metal seal is positioned in the end of the capacitor can and soldered at its periphery to the can wall, which is usually of silver.

Two possible methods are employed for sealing the anode wire:

(a) anode has tantalum wire already sintered in. The tantalum wire is welded to a solderable nickel lead. The weld area is enclosed within the solderable tube of the glass-metal seal, and the seal is completed by filling this tube with solder.

(b) anode has tantalum wire already sintered in. The tantalum wire is cropped off at the top of the tantalum tube which forms the centre of the glass-metal seal. The tube and wire are welded together to complete the hermetic seal. A solderable nickel lead is welded to the outside of the tantalum tube.

The present invention provides an electrolyte capacitor including an anode mounted substantially concentrically within an annular shaped cathode and separated therefrom by an electrolyte, contained within a can surrounding the cathode, the can being a hollow construction initially open at one end for insertion of the cathode and anode structures, the anode being provided with an aperture or recess for reception of an anode lead; also included is a seal for sealing the open end of the can, the seal including means for connecting the anode lead through the seal in electrical isolation from the can, and including a further sealing means within said can comprising a bung which is tightly fitted to surround the anode lead, said further seal being positioned between the anode and seal and preventing the electrolyte from contacting the seal at least during the sealing operation.

In a first preferred embodiment the can and anode are of tantalum and in a second preferred embodiment they are wholly or partly of niobium.

The anode is preferably coated with a dielectric oxide film. The electrolyte is preferably of either aqueous sulphuric acid or lithium chloride solution, or either of these two containing a gelling agent.

The cathode is preferably a highly porous sleeve of sintered tantalum powder crimped, welded or sintered into the tantalum casing of the capacitor.

The anode lead is preferably of tantalum and the seal is a tantalum lead-glass-tantalum ring seal which is affixed to the tantalum case by high energy beam, plasma arc, resistance weld or other suitable means.

The bung is preferably of polytetrafluorethylene and the "O" ring preferably of a fluorinated elastomer. The bung and "O" ring assembly not only isolate the electrolyte during the welding operation but provide a top anode support and an anti-vibration mount.

The present invention also provides a method of assembling an electrolytic capacitor in which an annular sleeve shaped cathode is inserted into the open end of a can. An anode structure is inserted into said can in a spaced apart relationship from said cathode, the space between said anode and cathode being filled with an electrolyte, said anode structure having an aperture for reception of an anode lead. A primary seal, for sealing the open end of the can, and comprising an anode lead electrically isolated from the rest of the seal, is formed. A secondary seal is positioned on the anode lead on the inside face of said primary seal to form a seal between said anode lead and said can prior to sealing of the primary seal of said capacitor. The end of the anode lead projecting from said secondary seal is machined to provide projections on said lead. The capacitor is assembled by forcing the projecting portion of said anode lead into said anode until the primary seal is in position. The primary seal is welded round its periphery to said can and the capacitor is subjected to an aging process to restore any damage to the anode and anode lead structure incurred during the pressing operation.

Figure 2:
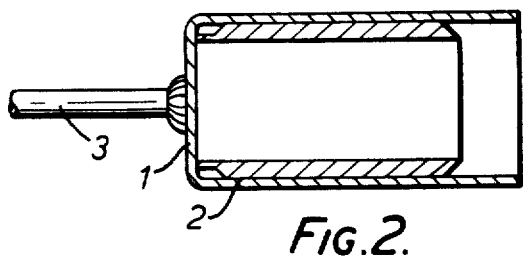
Figure 3:
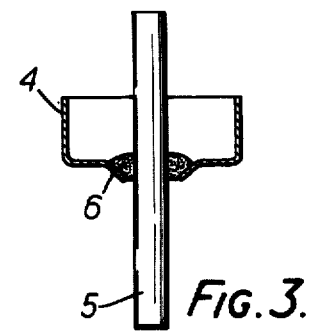
Figure 4:
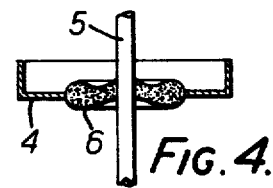
Figure 5:
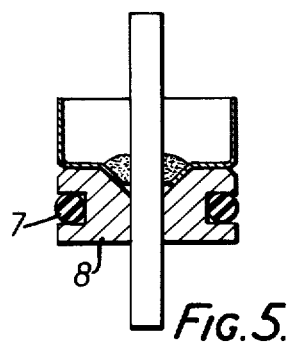
Figure 6:
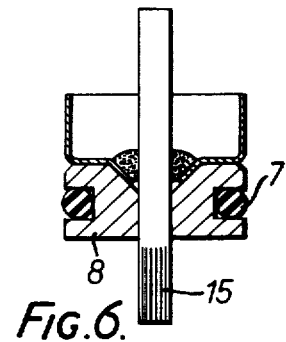

Embodiments of the present invention will now be described by way of example with reference to the accompanying drawings in which:

FIG. 1 shows a sectional view of the completed capacitor showing the novel seal construction, FIG. 2 shows a portion of the capacitor of FIG. 1, FIG. 3 shows a first closure member for the capacitor of FIG. 1, FIG. 4 shows a second closure member for the capacitor of FIG. 1, FIG. 5 shows a partial construction of the seal structure of the capacitor of FIG. 1 illustrating the method of construction, and FIG. 6 shows a further stage in the construction of the capacitor of FIG. 1.

Referring now to FIGS. 1 and 2 of the drawing, the capacitor includes a concentric sleeve 2 of tantalum powder which, when mechanically secured sintered or welded into the tantalum container 1, provides a cathode of greatly enhanced surface area (FIG. 2). The outer tantalum container 1 is produced by blanking out a disc from tantalum strip and deep drawing this into the form of a can. The sleeve 2 is made either by freezing a tantalum powder-liquid mixture in a rubber mould, followed by drying and sintering, or by pressing a tantalum powder or powder-wax mixture in a steel mould, followed by dewaxing (if necessary) and sintering.

The porous sleeve 2 may be secured to the outer can by mechanical constriction of the can, by welding, or by vacuum-sintering the sleeve and the can together. A solderable wire 3 is welded axially to the base of the can to provide the negative lead. The interior of the can 1 with its concentric sleeve 2 is anodised to provide a D.C. reverse voltage capability.

The tantalum-glass-tantalum seal of which possible forms are shown in FIGS. 3 and 4 is produced from three constituent parts. Item 4 is a centrally-pierced tantalum cup, prepared by blanking and shaping tantalum strip. Item 5 is a tantalum stud prepared from tantalum wire, while Item 6 is a glass preform prepared from an acid-resisting glass. The glass-tantalum seal can be a matched seal, using a glass having a coefficient of expansion similar to that of tantalum, or a compression seal. A fusion process is preferably employed in which chemical bonding takes place. The parts are assembled in a jig and heated in an evacuated furnace to between 1250° C. and 1400° C.; argon is introduced and heating continued. After the initial fusion, a reaction takes place between the metal oxide and the constituents of the glass, producing a seal having very satisfactory mechanical and electrical properties. This method of preparing the glass-to-metal seal is the subject of British Pat. No. 1,421,050.

In a practical capacitor the annular sleeve of Ta powder forming the cathode is manufactured as follows:

A high-capacitance tantalum powder, typically 4 micron particle size, is mixed with wax and pressed to a density of 6.5 to 8.5 g/cc; pressing can be accomplished separately in a die or by using the can as a die.

After the separate pressing operation, the cathode sleeve is pushed into the tantalum can.

Can and sleeve are heated to between 190° and 450° C. under vacuum to remove the wax binder. On dewaxing, the sleeve expands slightly and so is held in the can.

The wall of the can may be etched, prior to insertion of the cathode powder, to improve adhesion. Care must be taken not to etch the seal area at the mouth of the can.

Agglomerated powders or binderless powders may also be used for producing the cathode sleeve. A final fired density of 4.5 to 7.0 g/cc is achievable.

The cathode sleeve and can combination is anodised to between 4.5 and 7 V D.C., to withstand a reverse voltage of 3.0 V. Anodisation is carried out in a tantalum jig and the cans are kept vertical to allow the gases produced to escape.

For applications not requiring a reverse voltage capability greater than 1 V D.C., a platinum or ruthenium paint may be applied and fired onto the interior. Such methods are the subject of a patent of Plessey (U.K.) Limited, British Pat. No. 1,317,494.

In a practical embodiment the tantalum can is produced using 0.010 in thick tantalum strip, normal or grain-stabilised. The tantalum strip is degreased just prior to anodising for a period of 15 minutes at 25° C. within a voltage range of 30 to 100 V D.C. The material is blanked and the can is produced from the blank using a minimum of five drawing stages including trimming to length. Any high-pressure grade of deep-drawing lubricant can be employed; this is removed by degreasing and the can is fired in a radio-frequency furnace to remove all traces of the oxide film.

In a practical embodiment the central tantalum wire of the glass-to-metal seal is cleaned, prior to anodising, by immersion in a chemical etching solution. The wires are anodised to 200 V at 85° C. (or the equivalent voltage if another temperature is employed).

The cylindrical porous anodes are pressed by conventional means and sintered in the temperature range of 1600° to 2050° C. The density range is typically 6.5 g/cc to 10.5 g/cc. Anodisation is carried out in a tantalum expanded-metal basket; the applied voltage is raised progressively to at least 140% of the intended working voltage.

The electrolyte capacitor is assembled as described in the following steps:

(a) The portion of the central wire below the cup of the glass-to-tantalum hermetic seal is anodised to 200 V to provide a high-quality dielectric film.

(b) The anodised portion of the wire (5) is dipped into a viscous wire sealant.

(c) The "O" ring and bung assembly (7, 8) is pushed on the anodised portion of the wire until it rests up against the tantalum cup—see FIG. 5.

(d) The protruding portion of the anodised wire is operated upon by a press tool which produces knurled or barb-like indentations 15 in the surface—see FIG. 6.

(e) The cathode sleeve (2) and anode (10) are saturated with electrolyte, and electrolyte is dispensed into the cathode can.

(f) The bottom anode support (11) is positioned on the base of the anode, which is inserted centrally into the cathode sleeve and can assembly. A locating tool is used to ensure that the anode is inserted concentrically.

(g) The glass-to-metal assembly, fitted with "O" ring and bung, is positioned on top of the can (the "O" ring resting on the belled-out portion). The capacitor parts are put on a tool in a toggle press and a vacuum applied to an enclosure surrounding the tool. The "O" ring is pushed down level and the vacuum is released.

During this operation the barbed portion of the central wire is forced into the central hole or recess of the anode, stripping off sufficient of the anodically formed oxide to give good electrical contact. The central hole in the anode is slightly tapered and the wire is, therefore, secured mechanically within the anode block.

(h) The top of the can is turned in by about 5° to the vertical. This provides a tight, compact joint suitable for welding, as well as keeping the anode and wire under compression.

(i) The top of the can is welded to the adjacent top of the cup of the glass-to-metal seal assembly, by mounting the capacitor in a clamp and rotating it under the beam of high-energy radiation until the weld is completed.

(j) The capacitor is completed by welding a solderable lead (12) to the anode wire where it protrudes outwardly above the welded glass-to-metal seal.

(k) Healing of the anodic oxide film, damaged when the barbs on the central wire were driven into the central hole of the anode, is accomplished by an aging process (or burning) during which the capacitor is subjected to full rated voltage—at the upper operating temperature, for a period between 8 and 60 hours.

Welding Details

The capacitor is put in a clamp and rotated below a laser beam.

With a carbon dioxide laser, a wavelength band around 10.6 micrometer is employed, in continuous mode. A speed of 4 to 5 secs per revolution is used.

An output of 380 to 400 watts is typical (e.g. Ferranti 400 watt laser, MF400).

*Alternatively* a NEODYMIUM solid state laser can be used. This has a wavelength band of 1.06 micrometer, and supplies 4 to 60 Joules of energy per pulse. Between 2 and 4 pulses per second are used, with a pulse length of 2.75 millisecond.

The rotational speed of the capacitor clamp can be between 30 sec and 90 sec per revolution.

The advantages of the present capacitor are that no solder is used in its construction and, therefore, no corrosion is possible. Since there is no weld at the top of the narrow tantalum tube used in previous constructions there is no chance of thermal oxide being produced.

This is an advantage since it has been found that thermal oxide in contact with electrolyte leads to degradation of the electrical characteristics of the capacitor.

What is claimed is:

1. A wet electrolyte capacitor comprising:
   a can made from non-solderable valve metal,
   an annular shaped cathode disposed within said can,
   an anode made from non-solderable valve metal mounted substantially concentrically within said annular shaped cathode and separated therefrom by an electrolyte, contained within said can surrounding the cathode, the can being a hollow construction initially open at one end for insertion of the cathode and the anode,
   an anode lead, the anode being provided with a recess for reception of said anode lead,
   a seal for hermetically sealing the open end of the can, the seal including means for connecting the anode lead through the seal in electrical isolation from the can, and
   a further seal within said can comprising a bung which is tightly fitted to surround the anode lead, said further seal being positioned between the anode and said seal and preventing the electrolyte from contacting the seal at least during the sealing operation,
   said anode lead comprising a continuous piece of metal extending without jointing from the anode to the outside of the seal.

2. A wet electrolyte capacitor as claimed in claim 1, wherein the can and the anode are wholly made of tantalum.

3. A wet electrolyte capacitor as claimed in claim 1, wherein the anode is coated with a dielectric oxide film.

4. A wet electrolyte capacitor as claimed in claim 1, wherein the electrolyte is an aqueous sulphuric acid or lithium chloride solution.

5. A wet electrolyte capacitor as claimed in claim 4, wherein the electrolyte contains a gelling agent.

6. A wet electrolyte capacitor as claimed in claim 1, wherein the cathode is a highly porous sleeve of sintered tantalum powder which is connected to the capacitor can by one of crimping, welding and sintering.

7. A wet electrolyte capacitor as claimed in claim 1, wherein the seal is affixed to the can by one of a high energy beam, a plasma arc, and resistance welding.

8. A wet electrolyte capacitor as claimed in claim 1, wherein the bung is of polytetafluorethylene.

9. A wet electrolyte capacitor as claimed in claim 1, wherein said further seal includes an O-ring coacting with said bung, said O-ring being made of a fluorinated elastoner.

10. A method of assembling an electrolytic capacitor comprising the steps of:
    providing a can made from non-solderable valve metal and having an open end;
    inserting an annular sleeve shaped cathode into the open end of said can;
    inserting an anode structure made from non-solderable valve metal and having a recess into said can in a spaced apart relationship from said cathode;
    filling the space between said anode and said cathode with an electrolyte;
    forming a primary seal for hermetically sealing the open end of the can and incorporating an anode lead comprising a continuous piece of metal extending through the seal and electrically isolated from the rest of the seal;
    positioning a secondary seal on the anode lead and adjacent to the inside face of said primary seal to form a seal between said anode lead and said can prior to sealing of the primary seal of said capacitor;
    machining the end of the anode lead projecting from said secondary seal to provide projections on said lead;
    assembling said capacitor by forcing the projecting portion of said anode lead into said anode until the primary seal is in position;
    welding said primary seal around its periphery to said can; and
    subjecting said capacitor to an aging process to restore any damage to said anode and said anode lead incurred during said step of assembling said capacitor by forcing the projecting portion of said anode lead into said anode.

11. An electrolyte capacitor as claimed in claim 1, wherein the can and the anode are made, at least in part, of niobium.

* * * * *